Figure 1:
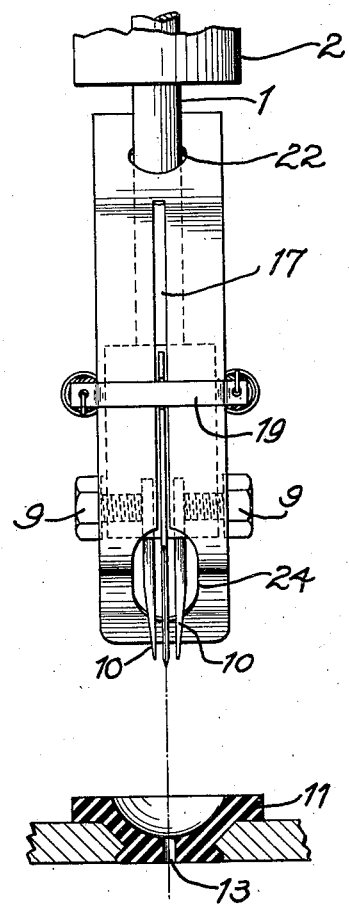

Oct. 18, 1938.          O. STEINWAND          2,133,588

FRUIT PITTER

Filed March 15, 1937

INVENTOR.

OTTO STEINWAND.

BY Lippincott & Metcalf

ATTORNEYS.

Patented Oct. 18, 1938

2,133,588

UNITED STATES PATENT OFFICE 2,133,588

FRUIT PITTER

Otto Steinwand, San Francisco, Calif., assignor to Sussman, Wormser & Co., San Francisco, Calif., a corporation of California Application March 15, 1937, Serial No. 130,836

4 Claims. (Cl. 146—19)

This invention relates to fruit pitting and slicing mechanisms, and particularly to devices for simultaneously pitting and halving such fruit as cherries, apricots, plums and the like.

Among the objects of my invention are: To provide a mechanism which will simultaneously pit and slice small fruits; to provide a device of the character described which will positively discharge the halves of the fruit into a suitable receiver; and to provide a device which, while saving one operation in the processing of the fruit, does not, by so doing, complicate the operation which is made to perform the joint function.

Other objects of my invention will be apparent or will be specifically pointed out in the description forming a part of this specification, but I do not limit myself to the embodiment of the invention herein described, as various forms may be adopted within the scope of the claims.

Figure 2:
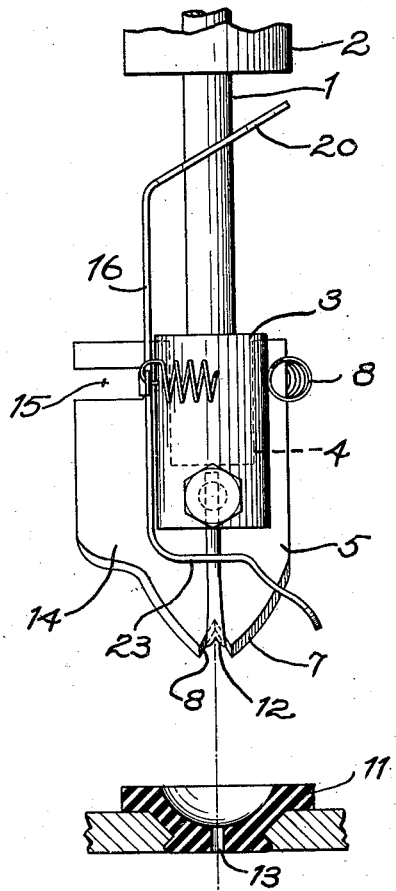

Referring to the drawings:

Figures 1 and 2 are fragmentary views of a fruit pitter of conventional type, equipped with a pitting knife of this invention, Figure 1 showing the knife and pitting prongs viewed edge-on, while Figure 2 shows a side view of the knife.

The invention is used in combination with a fruit pitter of conventional type, wherein a sliding spindle 1 is reciprocally mounted in a bearing carried by the frame 2, and has, mounted on its end, a knife holder 3.

In the form of the device here shown the knife holder 3 is slotted at its opposite sides and lower ends, as shown by the dotted line 4, to receive the butt end of the fruit pitting and splitting blade 5. This blade is brazed or otherwise firmly and permanently secured in the holder, although it is clear that it could be removably fastened in place were this deemed desirable. The cutting edge 7 of the blade is convex or generally pointed in form, but where the tip of the blade would otherwise be there is formed an edged notch 8. The blade is wide in comparison with the fruit to be pitted.

Mounted on each side of the notch, and held in place by set-screws 9, is a pitting prong 10. These prongs are slender and may either be sharply pointed or, preferably, may be made of "fishtail" shape as shown, with a notch 12 aligned with the notch 8 of the splitting blade, the bottoms of the notches in the prongs extending somewhat below the bottom of the notch in the blade, however.

The fruit is positioned beneath the knife in a rubber cup 11, and as the knife descends it splits the fruit in half. At the same time the pit centers itself within the notches 8 and 12, and is forced out through the hole 13, leaving the halves of the fruit impaled on the prongs 10.

Where a fruit pitter of the type here described is used on spheroidal fruit, such as cherries or the like, but the fruit is not split, it is possible to use a stationary stripper through which the pitting knife is retracted in order to remove the fruit from the knife, and the fruit may be made to roll into a suitable receiver. Where the fruit has been split, however, the halves will not roll satisfactorily, and an ejector mechanism for discharging the fruit into the receiver is necessary for satisfactory operation. In accordance with the present invention the ejector mechanism is constructed as follows:

The splitting blade 5 is provided with a projecting wing 14, and in this wing, adjacent the top of the holder, is formed a slot 15.

The ejector itself is preferably formed from a strap 16 of sheet metal. It has a straight portion materially longer than the head 3, in which there is formed a slot 17 through which the wing 14 passes, permitting the ejector to be held in frictional contact with the head by a resilient band which consists of a coiled spring 18 whose ends engage the ends of a strap 19 and press it against the ejector. The strap 19 passes through the slot 14 in the wing of the knife, thus being retained in position as the ejector slides beneath it.

The upper end 20 of the ejector is bent back at an obtuse angle from the straight portion, and is perforated or slotted at 22 to embrace the shaft 1. The lower end 23 of the ejector is bent back and down, and is provided with an aperture 24, connecting with the slot 17, through which aperture the blade 5 and the prongs 10 pass.

Because it is held frictionally against the head 3 the ejector will move up and down with the head as long as it meets no obstruction. When the device is in use, however, and the knife is advancing, the recurved portion 23 of the ejector strikes the top of the fruit and is slid upward with respect to the knife and shaft as the knife advances pitting and splitting the fruit, leaving the two halves impaled upon the prongs 10. As the shaft is retracted the ejector follows it until the upper end 20 strikes the frame 2, which acts as a stop. The retractive movement of the shaft continuing, the ejector is slid along it, thus forcing the two halves off the prong and finally, when the head reaches its upper position, the end 20 is gripped between the stop 2 and the head 3, and the ejector pivots upon the corner of the head, throwing the lower end of the ejector sharply to the left as viewed in Figure 2, and throwing the halves of the fruit in that direction and into a suitable receiver. Since reciprocating heads of machines of this character are almost universally spring-retracted, this action takes place at high speed, and the fruit is thrown off in a definite trajectory since it does not have the time to fall an appreciable distance from the prongs before the forward or outward motion of the ejector end occurs. The presence of the ejector does not complicate the operation of the machine or increase the duties of the operator in any way.

I claim:

1. In a fruit pitter having a shaft carrying a reciprocating head for forcing a pit through and out of the fruit, the combination on said head of a blade wider than the fruit to be pitted and having a notch at the tip thereof, a pair of prongs extending substantially parallel with said blade on either side thereof and substantially alined with said notch, and means for forcing the halves of the pitted fruit downwardly off of said prongs and then forwardly to clear said blade, said means comprising an element having a portion parallel to the plane of movement of said reciprocating head and shaft, a portion extending obliquely therefrom and around said shaft, a second portion recurved toward said shaft and adapted to engage fruit on said blade and prongs, said obliquely extending element being positioned to be engaged by said reciprocating head during retraction thereof to cause movement of said recurved portion normal to the plane of movement of said reciprocating head.

2. The combination with a fruit pitting machine including a sliding shaft reciprocably mounted in a frame and carrying a knife-holding head, of a pitting knife mounted on said head, and a fruit ejector comprising a strap of stiff material having a flat portion parallel to said shaft and having its upper end projecting back at an obtuse angle from said flat portion and embracing said shaft between said frame and head and its lower end also bent back and embracing said knife, and resilient means for holding said strap in frictional engagement with said head, so mounted and arranged that upon advance of said shaft the lower end will be engaged by the fruit and the ejector slid along said shaft to permit the knife to enter the fruit, and on retraction of said shaft the upper end of the ejector will engage the frame to force the fruit downward off of the knife and forward to discharge.

3. In a device of the class described, a framework having a journal, a reciprocable shaft slidable in said journal, a head mounted on said shaft, an ejector comprising a portion parallel to said shaft, a resilient band frictionally but slidably retaining said parallel portion against said head, an end portion projecting obliquely from said parallel portion to embrace said shaft between said journal and said head, and a second end portion recurved beyond said head, and a stop so positioned on said framework with respect to said head and said projecting ejector portion that retraction of said shaft will engage said obliquely projecting portion between said stop and head to tilt said ejector.

4. In combination with a fruit pitter mechanism including a reciprocating head, a flat knife blade carried thereby, said blade having a portion adjacent said head that is wider than the fruit to be pitted and having side cutting edges sloping toward a common point at the fruit engaging end of said flat knife blade, an inverted V-shaped notch at the tip of said blade to provide an entering wedge for each cutting edge to facilitate the slicing of such fruit, and a pair of prongs extending in the same general direction as the point of the knife, one of said prongs being on each side of said blade and closely adjacent thereto, each terminating in a notch in alinement with said first mentioned notch and extending slightly in advance of said flat knife blade to provide in combination with the notch portion of said blade means for centering and expelling the pit from said fruit.

OTTO STEINWAND.